United States Patent [19]

Yajima et al.

[11] Patent Number: 5,291,145
[45] Date of Patent: Mar. 1, 1994

[54] MICROWAVE PROCESSING EQUIPMENT

[75] Inventors: Yusuke Yajima; Ken'etsu Yokogawa, both of Tokyo, Japan

[73] Assignee: Hitachi, Ltd., Tokyo, Japan

[21] Appl. No.: 851,628

[22] Filed: Mar. 16, 1992

[30] Foreign Application Priority Data

Mar. 14, 1991 [JP] Japan .................................. 3-49341

[51] Int. Cl.$^5$ .............................................. H01S 1/02
[52] U.S. Cl. ........................................ 330/4; 330/4.8; 331/94.1
[58] Field of Search ..................... 330/4, 4.8; 331/94.1

[56] References Cited

U.S. PATENT DOCUMENTS 3,210,674 10/1965 Hughes .
3,223,932 12/1965 Levy .
3,736,518 5/1973 Anderson et al. .
3,978,417 8/1976 Fletcher .
4,887,037 12/1989 Yajima et al. .................. 324/316
4,969,155 11/1990 Kahan .

FOREIGN PATENT DOCUMENTS 503624 9/1992 European Pat. Off. .

OTHER PUBLICATIONS

Gleity et al, Physics Status Solidi Applied Research, vol. 90, No. 2, Aug. 16, 1985, pp. 209-213; abst. only.
Yajima et al, Nucl. Instrum. Methods Phys. Res. B, vol. 55, No. 1-4, pp. 607-610, Apr. 1991; abst. only grounded.

Primary Examiner—Nelson Moskowitz
Attorney, Agent, or Firm—Fay, Sharpe, Beall, Fagan, Minnich & McKee

[57] ABSTRACT

Novel microwave processing equipment includes a silicon single crystal containing neutral {110} planar four vacancies, a cooling mechanism for holding the silicon single crystal to a low temperature, a light pumping mechanism for irradiating light to the silicon single crystal, a magnetic field applying device for applying a static magnetic field to the silicon single crystal, an orientation holding mechanism for holding the silicon single crystal to a specific orientation with respect to the static magnetic field, an electromagnetic wave inputting mechanism for supplying an input electromagnetic wave to the silicon single crystal, and an electromagnetic wave outputting mechanism for extracting an output electromagnetic wave from the silicon single crystal. The input electromagnetic wave supplied in the silicon single crystal by the electromagnetic wave inputting mechanism is amplified by the stimulated emission produced in the silicon single crystal and passes through the electromagnetic wave outputting mechanism to be outputted to the outside. A microwave amplifier with narrow band width capable of amplifying the electromagnetic wave in the microwave range with low noise is thus obtained.

14 Claims, 5 Drawing Sheets

MICROWAVE PROCESSING EQUIPMENT

BACKGROUND OF THE INVENTION

The present invention relates to microwave processing equipment for amplifying or attenuating microwaves and more particularly to microwave processing equipment being suitable to amplify weak electromagnetic waves in the microwave range.

In the prior art, in order to amplify electromagnetic wave in the microwave range, an electron tubes such as a klystron or a traveling wave tube, and semiconductor elements such as a Gunn diode or an impact avalanche and transit time diode, have been used. These electron tubes and semiconductor elements are explained, for example, in Eitaro Abe, "Microwave Technology" (published by Tokyo University shuppankai, Tokyo, 1979) at pp. 127-135.

Among the above-mentioned devices, the electron tubes are applicable to microwave amplifications for broad frequency ranges, but there are problems in that they are large in size and weak to impact force, and high voltage and cooling water must be supplied. Moreover, and their life is short and their performance varies with the passage of time. On the other hand, the semiconductor elements have superior characteristics in handling due to their small size and their ability to operate at lower voltages in comparison to the electron tubes, but have difficulties in their limited frequency range, high price and lack of reliability at present, because the history of development of the semiconductor elements is short in comparison to that of the electron tubes.

Further, in any of these electron tubes and semiconductor elements, since a massive flow of electrons is controlled and amplification is carried out, there is an elementary problem where the flow is accompanied by the generation of noise. This problem becomes particularly serious when microwaves to be amplified are very weak.

SUMMARY OF THE INVENTION

Therefore, an object of the present invention is to provide microwave processing equipment which can amplify electromagnetic waves in the microwave region with low noise, and is especially suitable for amplification of weak microwaves.

In the present invention, in order to attain the above object, the microwave processing equipment is constituted by a solid state maser material having a state being composed of at least three spin sub-states, a cooling means for holding the solid state maser material to a low temperature, a pumping means for changing a population distribution of the spin sub-states of the solid state maser material from distribution of a thermal equilibrium state, a magnetic field applying means for applying a static magnetic field to the solid state maser material, an electromagnetic wave inputting means for supplying an input electromagnetic wave to the solid state maser material, and an electromagnetic wave outputting means for extracting an output electromagnetic wave from the solid state maser material.

A silicon single crystal containing neutral {110} planar four vacancies can be used as a solid state maser material having a state being composed of at least three spin sub-states as above described. Also the pumping means for changing the population distribution of the spin sub-states of the above-mentioned solid state maser material from distribution of the thermal equilibrium state may be a light pumping means for irradiating light to the solid state maser material.

That is, the microwave processing equipment according to the present invention is constituted more specifically by a silicon single crystal containing neutral {110} planar four vacancies, a cooling means for holding the silicon single crystal at a low temperature, a light pumping means for irradiating light to the silicon single crystal, a magnetic field applying means for applying a static magnetic field to the silicon single crystal, an orientation maintaining means for maintaining the silicon single crystal in a specific orientation with respect to the static magnetic field, an electromagnetic wave inputting means for supplying an electromagnetic wave to the silicon single crystal, and an electromagnetic wave outputting means for extracting the electromagnetic wave from the silicon single crystal. Further, when the solid state maser material is a silicon single crystal containing neutral {110} planar four vacancies, the wavelength of light irradiated to the silicon single crystal by the light pumping means is preferably within a range between 0.6 $\mu$m and 2.0 $\mu$m, and is more preferably selected near 1.3 $\mu$m.

The neutral {110} planar four vacancies can be easily formed in the silicon single crystal, by irradiating high energy electron beams, fast neutron beams, ion beams or the like to the silicon single crystal, and the neutral {110} planar four vacancies having been formed exist stably under the temperature of 180° C. or less and are not moved or annihilated. Two unpaired electrons exist in the neutral {110} planar four vacancies, and show paramagnetism for spin multiplicity 1 (triplet).

When the silicon single crystal is kept at a low temperature by the cooling means and light is irradiated thereto by the light pumping means, population inversion is produced in Zeeman sublevels within the paramagnetic electron state of the neutral {110} planar four vacancies. When the strength of the static magnetic field and the orientation of the silicon single crystal with respect to the static magnetic field are adjusted so that the energy difference between the Zeeman sublevels with the population inversion being produced therein is coincident with the photon energy of the input electromagnetic wave supplied to the silicon single crystal by the electromagnetic wave inputting means, the input electromagnetic wave supplied to the silicon single crystal by the electromagnetic inputting means is amplified by the stimulated emission accompanying with the transition between the Zeeman sublevels with the population inversion produced therein--, and passes through the electromagnetic wave outputting means and is outputted to the outside.

That is, the microwave processing equipment due to the present invention is a sort of solid state maser (MASER; Microwave Amplification by Stimulated Emission of Radiation). For a signal amplifier using the maser action, for example, a method of amplifying the weak time-varying, current using the abrupt voltage gradient characteristics of the maser action has been proposed as indicated in Japanese patent application Laid-Open No. 108782/1983. On the contrary, in the present invention, the weak microwave is amplified using the silicon single crystal containing the neutral {110} planar four vacancies, as a maser medium.

As the stimulated emission or absorption constituting the principle of the present invention is not accompanied by the massive flow of electrons, it essentially produces no noise. Therefore, the microwave processing equipment due to the present invention includes an amplifier with essentially low noise in comparison to the electron tube or the semiconductor element as above described. Further, in the solid state maser material (silicon single crystal containing neutral 110) planar four vacancies) which is a fundamental part of the microwave processing equipment according to the present invention, particle migration such as the massive flow of electrons is not caused at all during the operation. Therefore, since the microwave processing equipment according to the present invention is not limited by the life depending on the operation time, it is capable of highly reliable operation for a long time.

The foregoing and other objects and features of the present invention, as well as the effects obtained accompanying therewith will become apparent successively in the following description of embodiments.

DESCRIPTION OF PREFERRED EMBODIMENTS

Embodiments of the present invention will be described in detail referring to the accompanying drawings as follows.

Figure 1:
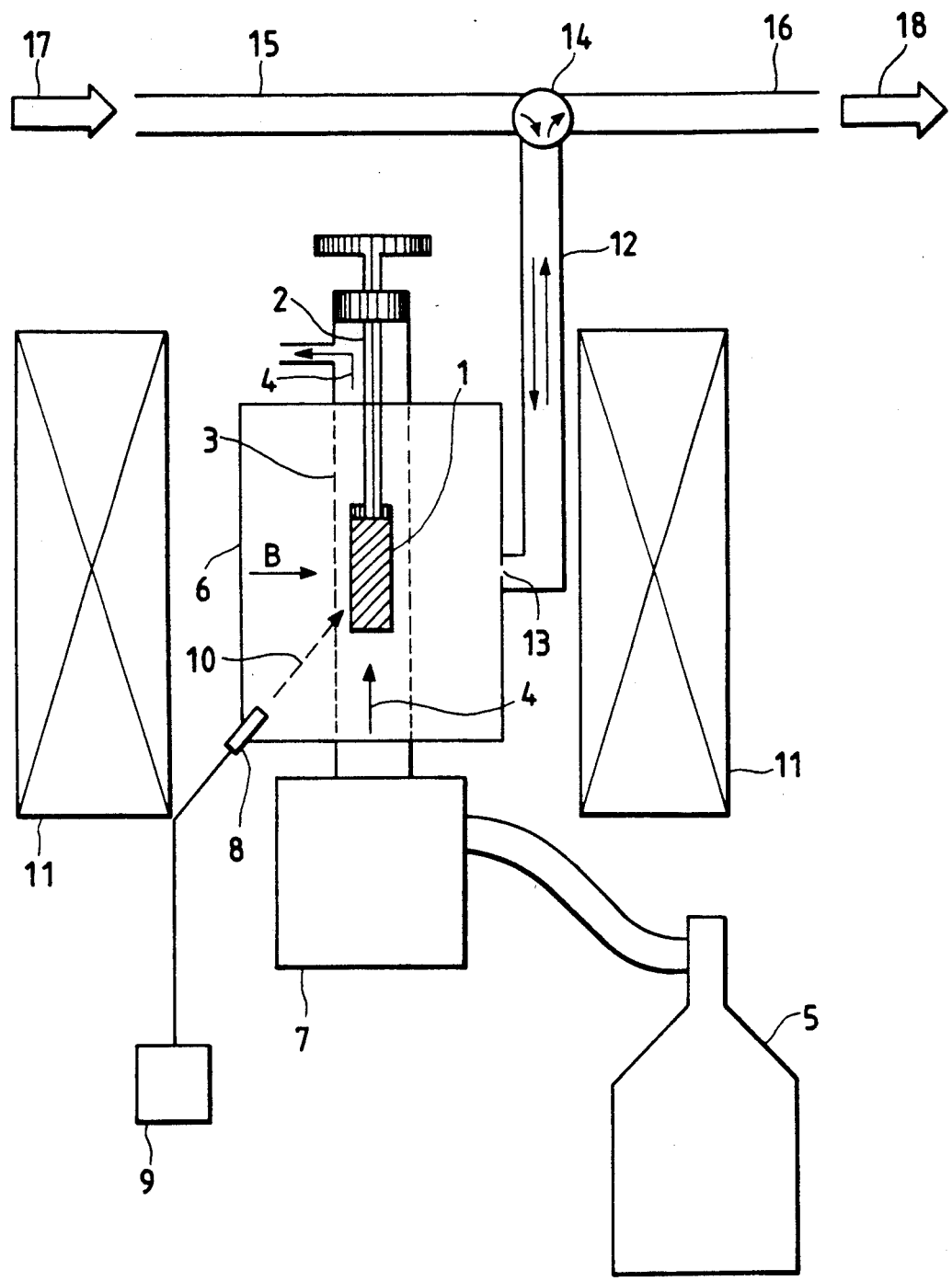
FIG. 1 is a diagram showing a constitution of a first embodiment of microwave processing equipment due to the invention.

FIG. 1 schematically shows a constitution of a first embodiment of microwave processing equipment constructed according to the teachings of the present invention. In FIG. 1, a silicon single crystal 1 containing neutral {110} planar four vacancies is held by an orientation holding device 2, and is cooled to a constant temperature below 20K by a helium gas flow 4 being controlled at a prescribed temperature within a cooling device 3. Here, the helium gas flow 4 can be obtained by vaporizing liquid helium supplied from a liquid helium container 5 in a helium gas generating and controlling device 7. Moreover, the temperature of the silicon single crystal 1 may be set to an arbitrary temperature in a temperature range from less than 20K to room temperature, if necessary. Also the neutral {110} planar four vacancies are produced within the silicon single crystal 1 by irradiating high energy electron rays having an energy of 1 MeV or more, fast neutron rays, ion beams having a total dose amount of $1 \times 10^{14}/cm^2$ or less or the like, to the silicon single crystal 1 at a temperature of 180° C. or less.

The silicon single crystal 1 is situated to a position in a microwave cavity resonator 6 where the microwave magnetic field amplitude is large. The microwave cavity resonator 6 is coupled electromagnetically with a waveguide 12 through a coupling hole 13. The waveguide 12 is coupled with an input waveguide 15 and an output waveguide 16 through a circulator 14. Input microwave 17 is introduced through the input waveguide 15, the circulator 14, the waveguide 12 and the coupling hole 13 into the microwave cavity resonator 6. Then microwave within the microwave cavity resonator 6 passes through the coupling hole 13, the waveguide 12, the circulator 14 and the output waveguide 16 and is outputted as output microwave 18 to the outside.

Also light 10 having a wavelength near 1.3 μm can be irradiated to the silicon single crystal 1 by a light irradiation device 8. Intensity of the light 10 being irradiated to the silicon single crystal 1 can be varied continuously within a range from the maximum output light intensity of the light irradiation device 8 to 0 irradiation by a light control device 9 which constitutes a light pumping means.

Further, a static magnetic field B having high homogeneity (inhomogeneity below 0.01%) is applied to the silicon single crystal 1 by a magnetic field applying device 11. An electromagnet or a permanent magnet may be used as the magnetic field applying device 11. When either magnet is used, the intensity of the static magnetic field B applied to the silicon single crystal 1 can be varied continuously. Here, illustration is omitted regarding the mechanism for varying the intensity of the static magnetic field B.

Next, the operation principle for the equipment of the embodiment will be described.

First, orientation the direction of the silicon single crystal 1 is controlled by the orientation holding device 2 so that the direction of the static magnetic field B being applied by the magnetic field applying device 11 can be rotated in the (110) plane of the silicon single crystal 1, and the direction of the static magnetic field in the {110} plane shall be expressed by the inclination angle θ from the <100> axis.

Figure 2:
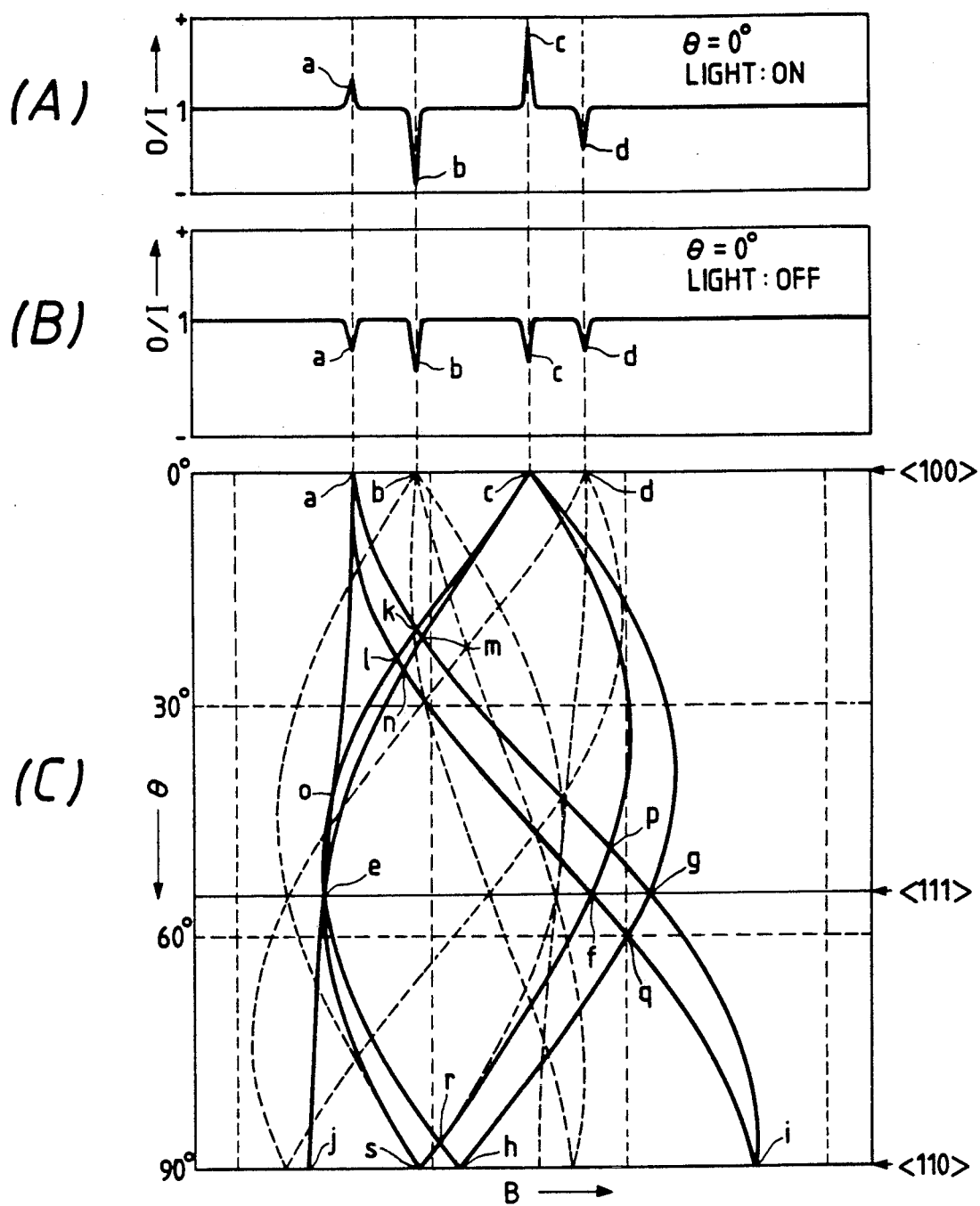
FIG. 2(A), 2(B), and 2(C) are a diagram explaining the principle of operation of the microwave processing equipment according to the invention.

When the inclination angle θ is made 0°, that is, when the direction of the static magnetic field is held in parallel to the <100> axis, the intensity of the static magnetic field B is varied slowly, and the intensity variation of the output microwave in this case is shown in FIG. 2(A), (B). In FIG. 2(A), (B), the abscissa indicates the intensity of the static magnetic field B being applied, and the ordinate indicates the ratio (O/I) of the intensity of the output microwave being applied to the intensity of the input microwave.

FIG. 2(A) shows the case that the light 10 is irradiated at a temperature of 10K, and FIG. 2(B) shows the case that the light 10 is not irradiated at the temperature remaining at 10K. Here, the intensity of the output microwave is varied at four points (a, b, c and d respectively) on the abscissa indicating the intensity of the staticmagnetic field B, because among the three Zeeman sublevels in the paramagnetic electron state of the spin multiplicity 1 (triplet) of the neutral ({110} planar four vacancies, the energy difference between two sublevels adjacent to each other is coincident with the photon energy of the input microwave in the static magnetic field at each of these points, and, paramagnetic resonance takes place. Each of the neutral {110} planar four vacancies indicates paramagnetic resonance in two intensity values of the magnetic field because each vacancy is a triplet having a spin multiplicity of 1, as mentioned above. However, since the neutral {110} planar four vacancies distributed in the silicon single crystal 1 can take two inequivalent orientations for the static magnetic field when the direction of the static magnetic field is in parallel to the {110} axis, it follows that the paramagnetic resonance can be observed in all four values of the static magnetic field intensity. When the frequency $\Omega$ of the input microwave is near 10 GHz (×band), the intensity variation of the output microwave caused by the paramagnetic resonance appears over a width of several mT (milli Tesla) when the static magnetic field intensity B is near 0.35 T (Tesla). When the frequency $\omega$ (GHz) of the input microwave is varied, the static magnetic field intensity B(T) must be adjusted according to an approximate relation of $B = 0.35 \times \omega$.

When the light 10 is irradiated as shown in FIG. 2(A), the output microwave is amplified while the static magnetic field intensity B is at the points a, c, and the output microwave is attenuated while the field intensity B is at the points b, d. On the contrary, when the light 10 is not irradiated as shown in FIG. 2(B), the output microwave is attenuated at each of the points a, b, c and d. The reason why such difference occurs depending on whether the light irradiation exists or not, may be explained as follows.

When the light is not irradiated, the thermal equilibrium is established within the three Zeeman sublevels, and the occupation number becomes less at the Zeeman sublevel of higher energy. Therefore in this case, absorption of microwave photons due to paramagnetic resonance exceeds emission of an microwave photons due to the stimulated emission, and the output microwave is attenuated in comparison with the input microwave by the amount corresponding to the difference between the absorption and the emission. Such absorption of the microwave photon can be widely observed when thermal equilibrium is established in the Zeeman sublevel (paramagnetic resonance absorption). In the case that the electrical resistivity of the silicon single crystal 1 at room temperature is sufficiently high, even if the silicon single crystal 1 is set to room temperature, similar results to the case where the light is not irradiated at 10K as shown in FIG. 2(B) can be obtained.

On the other hand, when the light is irradiated, the distribution of the occupation number for these three Zeeman sublevels deviates from that at thermal equilibrium. Therefore, in the combination of the two sublevels among the three Zeeman sublevels, the occupation number for the sublevels at the higher energy may become larger than the occupation number for the sublevels at the lower energy (spin alignment). In this case, the stimulated emission of the microwave photon due to the paramagnetic resonance exceeds the absorption of the microwave photons and the output microwave is amplified in comparison with the input microwave by the amount corresponding to the difference therebetween (points a, c in FIG. 2(A)). At the same time, the amount of the paramagnetic resonance absorption also varies due to the deviation of the distribution of the occupation number from the distribution at the thermal equilibrium (the difference between the points b, d in FIG. 2(A) and the points b, d in FIG. 2(B)).

In the present invention, amplification of the microwave is carried out using the stimulated emission at the Zeeman sublevels of the neutral {110} planar four vacancies as mentioned above. That is, the microwave processing equipment due to the present invention is a sort of solid state maser.

The above-mentioned amplification function depends on the static magnetic field intensity B and the orientation of the silicon single crystal 1 with respect to the direction of the static magnetic field. As shown in FIGS. 2(A), 2(B), when the inclination angle $\theta$ indicating the direction of the static magnetic field is 0°, that is, when the direction of the static magnetic field is in parallel to the <100> axis, the amplification function can be obtained when the static magnetic field intensity B coincides with the point a or the point c in the figure. FIG. 2(C) shows the variation of the static magnetic field intensity (curves shown by solid line) where the amplification function for the variation of the inclination angle $\theta$ with respect to one of the <110> axes of the static magnetic field B can be obtained, and the variation of the static magnetic field (curves shown by dotted line) where the attenuation function takes place, when the direction of the static magnetic field B is rotated in the {110} plane of the silicon single crystal 1.

In FIG. 2(C), efficient amplification can be realized when the static magnetic field intensity B and the inclination angle $\theta$ are selected so that the curves shown by solid lines cross each other. This condition is met at each of the points a, c, e, f, g, h, i, k, 1, m, n, o, p, q, r and s in FIG. 2(C). However, among these points, the point k and the point s are very close to points where the attenuation function takes place. Accordingly, such a point is not very suitable to be used for amplification. Also in the conditioned points a, c, e, f, g, h, i where the direction of the static magnetic field becomes parallel to any of the <100>, <111>, <110> axes among the crystal axes of the silicon single crystal, adjustment of the direction of the static magnetic field is easy and therefore these points can be easily used. Further the conditioned points c, e, i, j are relatively remote from other amplification conditioned points, and therefore are effective when an input microwave having a desired frequency is to be amplified selectively. Also where the curves shown by solid lines cross each other, as there are differences in the amplification efficiency (refer to the points a, c in FIG. 2(A)), high amplification efficiency can be obtained if the conditioned points, e.g., points c, e in FIG. 2(C) are selected.

The amplification action of the amplifiers according to the present invention as previously explained is very sensitive to the static magnetic field intensity and the orientation of the silicon single crystal 1 with respect to the static magnetic field. For example, when the orientation of the silicon single crystal 1 with respect to the static magnetic field is fixed, the amplification function will disappear if the static magnetic field intensity deviates by 0.03% from the conditional value (center value) where the amplification function can be obtained. On the contrary, the dynamic range for amplification with respect to the frequency of the input microwave is very small. Therefore the amplifier due to the present invention has very low noise, and is suitable especially for amplification when the input microwave is very weak. Also the microwave processing equipment according to the present invention has both the advantage of having a narrow band width and the advantage of the center frequency being continuously variable, because it is easy to change the frequency of the microwave to be amplified by changing the static magnetic field intensity or the orientation of the silicon single crystal 1 as mentioned already.

Next, a procedure in the case of actually amplifying the input microwave will be described.

When no significant noise components or unnecessary frequency components are contained in the input microwave 17, first, the direction of the static magnetic field is adjusted to some extent by the orientation holding device 2. The static magnetic field intensity B is varied while the intensity of the output microwave 18 is monitored, and the static magnetic field intensity is fixed at the position where the output microwave intensity becomes maximum. Then, the direction of the static magnetic field is adjusted finely by the orientation holding device 2 again to the direction where the output microwave intensity becomes maximum. Then, if necessary, the fine adjustment for the intensity and the direction of the static magnetic field is repeated until the output microwave intensity becomes maximum.

On the other hand, when noise components or unnecessary frequency components are contained abundantly in the input microwave 17, using the standard signal source having only a specific frequency component to be amplified, the direction of the static magnetic field is adjusted in advance according to the above procedure so that only the specific frequency component can be amplified. Then, the intensity and the direction of the static magnetic field are finely adjusted while the intensity of the output microwave 18 is monitored, and the conditional point is found where the output microwave intensity becomes maximum.

When the frequency of the input microwave 17 to be amplified is always constant, the above-mentioned procedures are unnecessary excepting that fine adjustment is carried out more or less according to necessity. Moreover, especially when the adjustment using the standard signal source is frequently carried out, the work efficiency is good if the high resistance part having an electrical resistivity that is not less than 100 Ω cm is used as the silicon single crystal 1. This is because the fundamental adjustment can be carried out at room temperature, as the paramagnetic resonance absorption similar to the case at the extremely low temperature (refer to FIG. 2(B)) can be observed at room temperature, if the high resistance part is used as the silicon single crystal 1.

Figure 3:
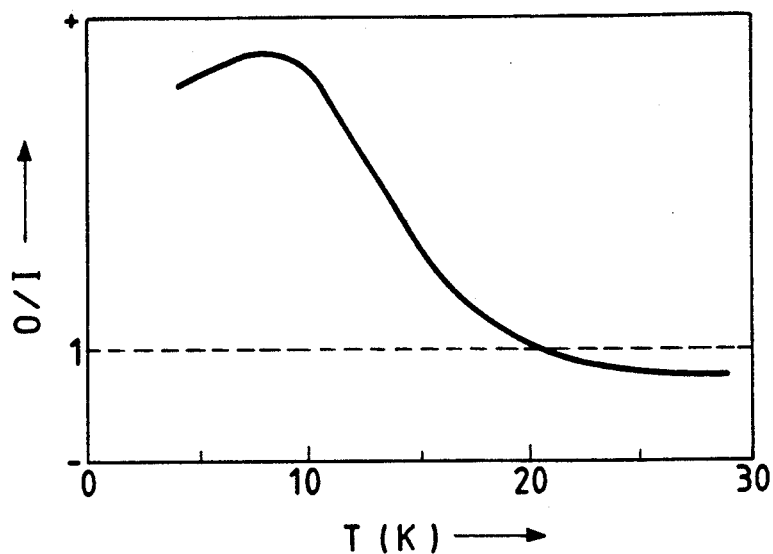
FIG. 3 is a diagram explaining the operation of the microwave processing equipment according to the invention.

As described already, in order to carry out microwave amplification by the microwave processing equipment according to the present invention, the silicon single crystal 1 must be cooled to the extremely low temperature. FIG. 3 shows the relation between the efficiency of the microwave amplification (O/I) and the temperature T(K) of the silicon single crystal 1. As is clearly seen from FIG. 3, microwave amplification occurs at temperatures below 20K, and especially the maximum amplification efficiency is obtained at the temperature range between 5K and 10K. The temperature characteristics are related to the case where the frequency for the microwave to be amplified is found near 10 GHz, that is, in the so-called X band. When the frequency of the microwave to be amplified is lower than this, the microwave amplification function takes place at a temperature that is ever lower than the above temperature. Contrarily, when the frequency of the microwave to be amplified is higher than the above frequency, the amplification function can be carried out even at a temperature higher than 20K as above described.

Figure 4:
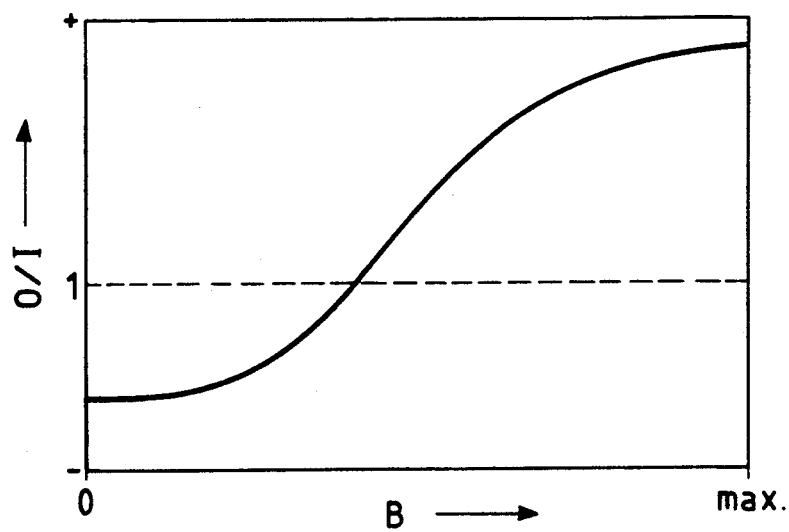
FIG. 4 is a diagram explaining the operation of the microwave processing equipment according to the invention.

In addition to the above-mentioned cooling, the light irradiation is also a necessary condition for the microwave amplification. FIG. 4 shows the relation between the efficiency of the microwave amplification (O/I) and the light intensity to be irradiated to the silicon single crystal 1. As is clear from FIG. 4, when the irradiated light intensity is strong to some extent, the amplification function can be obtained, and when the irradiated light intensity is weak, the output microwave is attenuated with reference to the input microwave. Variation of gain from the amplification to the attenuation is continuous and smooth with reference to the variation of the irradiated light intensity. In the embodiment shown in FIG. 1, as the intensity of the light 10 to be irradiated to the silicon single crystal 1 can be varied continuously, the gain can be varied continuously in the range from attenuation to amplification. That is, the equipment in FIG. 1 becomes a narrow band amplifier when the irradiated light intensity is sufficiently strong. Contrarily, when the irradiated light intensity is made sufficiently weak or the light is not at all irradiated, the equipment becomes a band elimination filter having very abrupt characteristics. When the equipment is used either as the amplifier or as the filter, the noise is very small and becomes constant.

Next, a second embodiment of the present invention will be described using FIG. 5.

Figure 5:
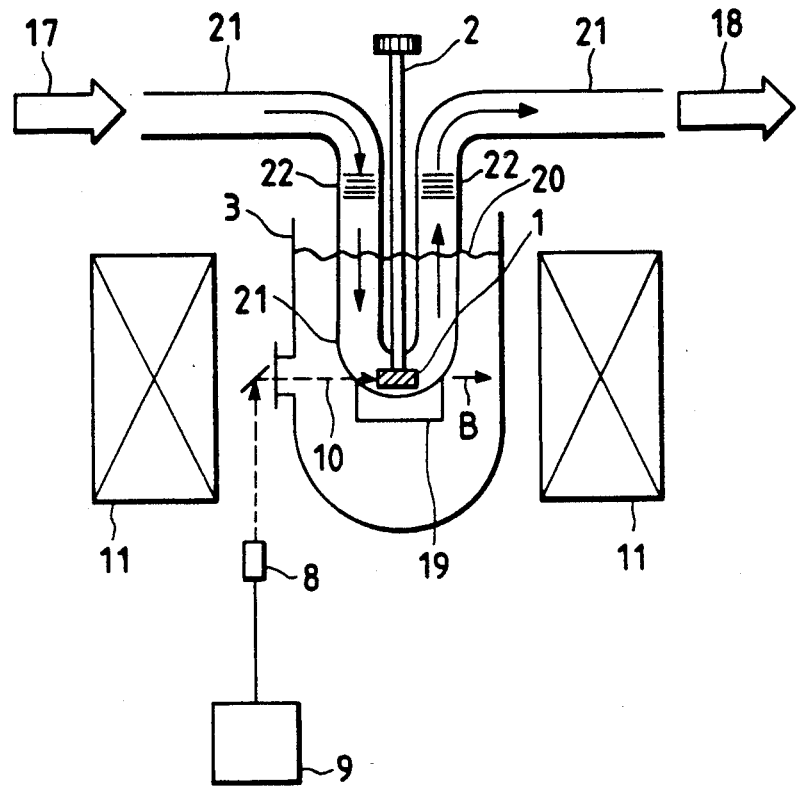
FIG. 5 is a diagram showing a constitution of a second embodiment of microwave processing equipment according to the invention.

In FIG. 5, a silicon single crystal 1 containing neutral {110} planar four vacancies is held by an orientation holding device 2, and is cooled to a constant temperature below 20K by a temperature control device 19 within a cooling device 3 filled with liquid helium 20. Of course, the temperature of the silicon single crystal 1 can be set to arbitrary temperatures in the range from less than 20K to room temperature according to necessity.

The silicon single crystal 1 is located within a waveguide 21 penetrating the inside of the cooling device 3. A thermal insulation part 22 is provided between a part of the waveguide 21 entering the inside of the cooling device 3 and a part thereof extending to the outside. Input microwave 17 passes through the waveguide 21, and is supplied to the silicon single crystal 1. The microwave from the silicon single crystal 1 passes through the waveguide 21, and is outputted as output microwave 18.

Light 10 having wavelength near 1.3 μm can be irradiated to the silicon single crystal 1 by a light irradiation device 8. Here, the intensity of the light 10 being irradiated to the silicon single crystal 1 can be continuously varied in the range upto the maximum allowable output intensity of the light irradiation device 8 by the light control device 9.

Further, static magnetic field B having high homogeneity (varying rate not more than 0.01%) is applied to the silicon single crystal 1 by a magnetic field applying device 11. An electromagnet or a permanent magnet may be used as the magnetic field applying device 11. When either magnet is used, the intensity of the static magnetic field to be applied to the silicon single crystal 1 can be continuously varied, but illustration of a mechanism therefor shall be omitted here.

The microwave processing equipment according to this embodiment operates similarly to the equipment of the embodiment shown in FIG. 1. Since the equipment in this embodiment is not provided with a microwave cavity resonator, efficiency of the microwave amplification tends to lower in comparison with the equipment shown in FIG. 1, but the equipment constitution is simple and the handling of the equipment easy.

Figure 6:
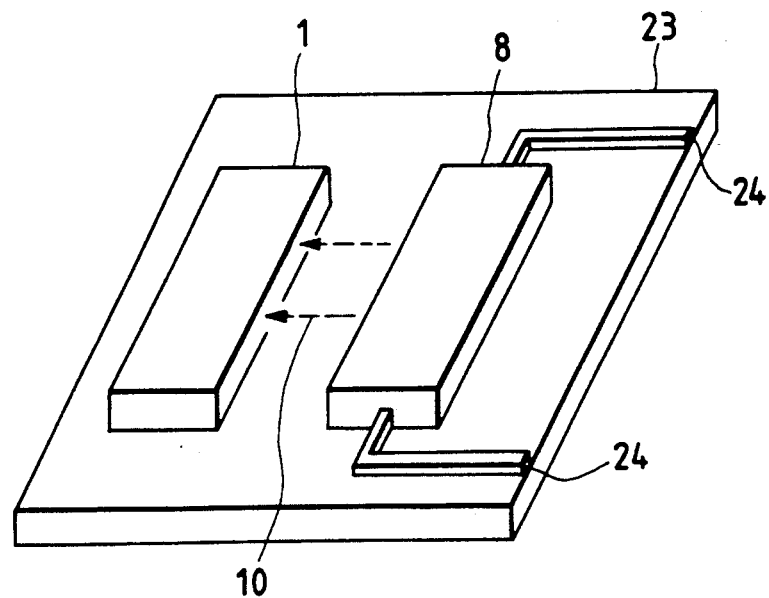
FIG. 6 is a diagram showing a constitution of a third embodiment of microwave processing equipment according to the invention.

Next, a third embodiment according to the present invention will be described using FIG. 6.

This embodiment concerns a concrete constitution of parts of the silicon single crystal 1 and the light irradiation device 8. In FIG. 6, the silicon single crystal 1 and the light irradiation device 8 are composed of a solid state light emitting device such as a light-emitting diode, a semiconductor laser or the like, and are fixed on the same substrate 23 as one body. Electrical current to the light irradiation device 8 is adjusted so as to irradiate the light 10 with a prescribed intensity onto the silicon single crystal 1. The electrical current flows through a current lead 24 from the light control device 9, which is not shown in FIG. 6. Thus, the silicon single crystal 1 and the light irradiation device 8 are made one body, so that not only can the equipment be made of small size, but also the operability of the equipment and reliability of its operation are improved.

As means for cooling the silicon single crystal 1, a device similar to either of those illustrated in FIG. 1 or FIG. 5 may be used, but the substrate 23 as a whole may instead be cooled by an electronic cooling means utilizing the Peltier effect. Using such an electronic cooling means, the manipulation and the maintenance of the equipment are simplified significantly in comparison with the cooling means using the liquid helium 20.

Next, a fourth embodiment according to the present invention will be described using FIG. 7.

Figure 7:
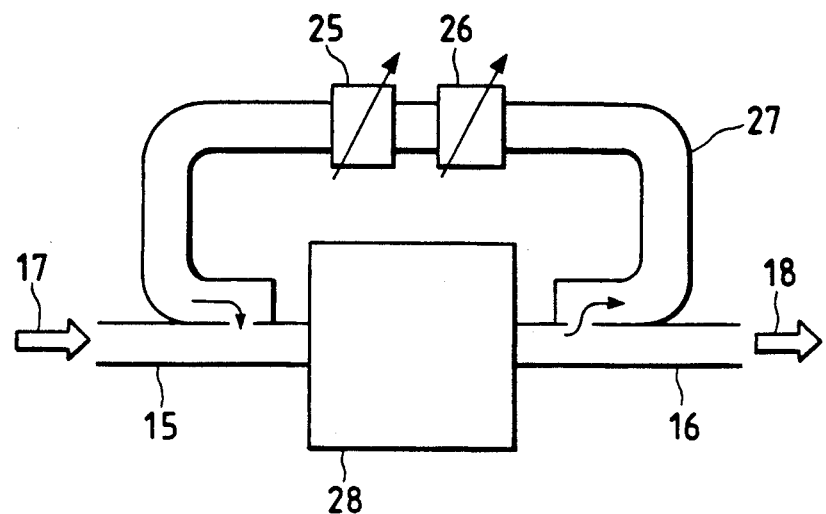
FIG. 7 is a diagram showing a constitution of a fourth embodiment of microwave processing equipment according to the invention.

In the embodiment shown in FIG. 7, a part of the output electromagnetic wave is extracted from the output waveguide 16 and is subjected to the phase and amplitude adjustment by a phase shifter 25 and an attenuator 26, and then the processed electromagnetic wave is fed back to the side of the input waveguide 15 by a feedback circuit 27. That is, a part of the electromagnetic wave is supplied again (positive feedback) to the amplifier 28 which has the constitution indicated in either of FIG. 1, FIG. 5 and FIG. 6, to thereby raise the amplification rate. Here, the order for the phase shifter 25 and the attenuator 26 in the feedback circuit 27 may be the reverse to that indicated in the figure. This embodiment is superior to the embodiments shown in FIG. 1, FIG. 5 and FIG. 6 from the view point of gain and signal/noise ratio by providing the feedback circuit 27.

Figure 8:
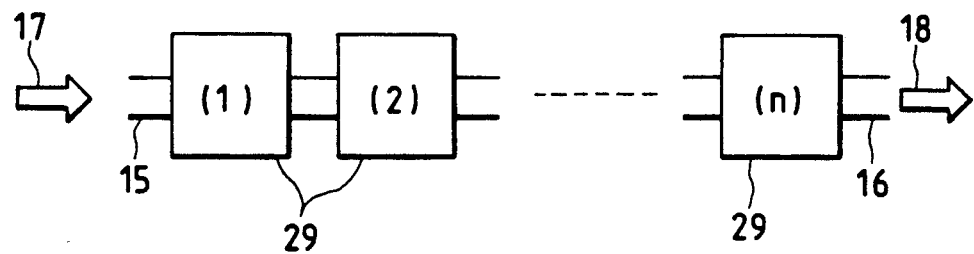
FIG. 8 is a diagram showing a constitution of a fifth embodiment of microwave processing equipment according to the invention.

Next, a fifth embodiment according to the present invention will be described using FIG. 8.

In this embodiment, amplification is carried out by combining a plurality (n pieces) of amplifiers 29 having constitutions indicated in either of FIG. 1, FIG. 5, FIG. 6 and FIG. 7. The way of combining is that, for n amplifiers (hereinafter, an amplifier (1), an amplifier (2), ..., an amplifier (n)), the output waveguide 16 of the amplifier (i)[i=1, 2, ..., n−11] is connected to the input waveguide 15 of the amplifier (i+1). Then, the input electromagnetic wave 17 is supplied from the input waveguide 15 of the amplifier (1), and the output electromagnetic wave 18 is extracted from the output waveguide 16 of the amplifier (n).

As the amplifier according to the present invention has low noise in comparison with other amplifiers in the prior art, the multistage amplifier constitution is particularly effective in order to improve the amplification rate.

The maser action used in the present invention is a phenomenon which occurs in the system where a spin level having a spin multiplicity of 1 or more (that is, a level having spin sublevels not less than 3) is provided, and the inversion distribution can be realized between the spin sublevels by the disclosed light pumping means or the like. In general, the spin sublevels are split even in a zero magnetic field because of the spin-orbit interaction, the spin-spin interaction or the like. Therefore, if a microwave has a frequency corresponding to the energy for splitting width between sublevels where inversion distribution has been realized, amplification is possible according to the same principle as that of the present invention, even if the static magnetic field is not applied from the outside (maser amplification in a zero magnetic field). However, regarding the maser amplification in the zero magnetic field, as the frequencies of the microwave capable of being amplified are extremely limited, utilization of this as an amplifier is not practical.

In the microwave processing equipment according to the present invention, since the stimulated emission is used as the principle for amplification, the equipment has low noise in comparison with the amplifier carrying out the amplification by controlling the massive flow of electrons, such as a prior art electron tube or semiconductor element as above described. Therefore, a even weak microwave can be amplified with a high signal/noise ratio.

Further, as the microwave amplifier according to the present invention has a very narrow band width, and the center frequency of the amplification band width can be easily changed by the adjustment of the intensity of the static magnetic field or the orientation of the silicon single crystal, amplification having a high Q value can be carried out as regards the microwave having a desired frequency.

In the silicon single crystal which is a fundamental part of the microwave processing equipment according to the present invention, movement of materials such as the massive flow of electrons does not at all occur during the operation. Therefore, as the life is not limited depending on its operating time, the reliability can be maintained for a long time.

Then, furthermore, the intensity of the output microwave can be adjusted continuously with reference to the intensity of the input microwave in the range from attenuation to amplification by varying the intensity of light irradiated to the silicon single crystal. That is, the microwave processing equipment according to the present invention can be used as both a microwave amplifier with a narrow band width and a band elimination filter having abrupt characteristics, without changing its equipment constitution.

What is claimed is:

1. An electromagnetic wave processing system, comprising:
   a solid state electromagnetic wave amplification material having a state being composed of three or more spin sublevels;
   a cooling means for holding said solid state material to a temperature of 20K or less;
   a pumping means for changing a population distribution of the spin sublevels of said solid state material in a range from a thermal equilibrium state to a state deviating from thermal equilibrium;
   a magnetic field applying means for applying a static magnetic field to said solid state material;
   an electromagnetic wave inputting means for supplying an input electromagnetic wave to said solid state material; and an electromagnetic wave outputting means for extracting an output electromagnetic wave from said solid state material;

wherein said solid state material is a silicon single crystal containing neutral {110} planar four vacancies.

2. An electromagnetic wave processing system according to claim 1, wherein said pumping means is a light pumping means for irradiating light to said solid state material.

3. An electromagnetic wave processing system according to claim 1, further comprising an orientation holding means for holding said solid state material to a specific orientation with respect to the static magnetic field applied to said solid state material by said magnetic field applying means.

4. An electromagnetic wave processing system according to claim 1, wherein said solid state electromagnetic wave amplification material is a solid state maser material, and wherein the electromagnetic wave supplied to said solid state maser material by said electromagnetic wave inputting means is a microwave.

5. An electromagnetic wave processing system according to claim 1, wherein said cooling means holds a temperature of said solid state material at a constant temperature of 20K or less.

6. An electromagnetic wave processing system according to claim 2, wherein the wavelength of light irradiated to said solid state material by said light pumping means is in a range between 0.6 $\mu$m and 2.0 $\mu$m.

7. An electromagnetic wave processing system according to claim 1, wherein the resistivity of said silicon single crystal at room temperature is 100 $\Omega$ cm or more.

8. An electromagnetic wave processing system according to claim 3, wherein said solid state material is a silicon single crystal composed of a cubic lattice, and said orientation holding means holds the orientation of said silicon single crystal so tat the direction of the static magnetic field applied to said silicon single crystal by said magnetic field applying means becomes parallel to either of the <100>, <111>, <110> axes among the crystal axes of said silicon single crystal.

9. An electromagnetic wave processing system according to claim 3, further comprising means for varying the intensity of light irradiated to said solid state material by said light pumping means.

10. An electromagnetic wave processing system according to claim 1, further comprising an electromagnetic wave feedback means for feeding-back a part of the output electromagnetic wave from said electromagnetic outputting means to the side of said electromagnetic wave inputting means, for mixing the output electromagnetic wave being fed back with the input electromagnetic wave, and for supplying the mixed wave to said solid state material.

11. An electromagnetic wave processing system according to claim 10, wherein said electromagnetic wave feedback means comprises means for adjusting the phase and amplitude of the electromagnetic wave to be fed back.

12. An electromagnetic wave processing system, wherein a plurality of the electromagnetic wave processing systems according to claim 1 are connected in multiple stages.

13. An electromagnetic wave processing system according to claim 2, wherein said solid state material and said light pumping means are installed and integrated on the same substrate.

14. An electromagnetic wave processing system according to claim 1, wherein said silicon single crystal is a silicon single crystal obtained by irradiating an electron beam with energy of 1 MeV or more, a fast neutron beam, or an ion beam having a total dose amount of $1 \times 10^{14}/cm^2$ or less to the silicon single crystal being at a temperature of 180° C. or less.

* * * * *